United States Patent Office 3,585,126
Patented June 15, 1971

3,585,126
CELLULOSE MIXED ESTER REVERSE OSMOSIS MEMBRANE AND ITS USE
Charles R. Cannon, Baldwin Park, and Paul A. Cantor, West Covina, Calif., assignors to Aerojet-General Corporation, El Monte, Calif.
No Drawing. Filed Feb. 19, 1969, Ser. No. 800,751
Int. Cl. B01d 13/00
U.S. Cl. 210—23
5 Claims

ABSTRACT OF THE DISCLOSURE

A reverse osmosis membrane prepared from mixed esters of cellulose, for example, cellulose acetate propionate, cellulose acetate isobutyrate, cellulose acetate maleate, and cellulose acetate methacrylate. The properties of membranes containing an unsaturated ester may be altered by cross-linking through the unsaturated group. The degree of total ester substitution is desirably in the range of 2.4 to 2.8, preferably in the range of 2.5 to 2.7.

---

This invention relates to reverse osmosis membranes prepared from mixed esters of cellulose.

It is known to employ cellulose acetate membranes in a reverse osmosis technique for the desalination of ocean and brackish waters and generally for the separation of water from various aqueous solutions. In one prior art process for the preparation of the membrane, as taught in Loeb et al., U.S. Pats. Nos. 3,133,132 and 3,133,137, cellulose acetate is dissolved in a suitable organic solvent such as acetone to form a casting solution which in addition contains water and a swelling agent for the cellulose ester. Loeb et al. disclose in their patent the use of perchlorate salts as the swelling agents. Water in the casting solution serves as a solvating agent and is believed to form with the swelling agent a molecular or ionic complex (a hydrate) which is attracted to the functional groups of the cellulose acetate, thus achieving a swelling of the cellulose. In the manufacture of the membrane the casting solution is dispersed in a thin film on a suitable casting surface, following which the solvent of the thin film is usually permitted to partially evaporate and the film is then set or gelled through a desolvation mechanism by immersion in cold water. The cast film which at this stage of manufacture has a swollen gel structure is next annealed to provide a tight membrane having the ability to pass water and restrain passage of salt. During the annealing process, a contraction of the swollen gel structure is accomplished. Prior to annealing, the swollen cellulose ester membrane possesses a primary gel structure which exhibits high water transport and low salt retention. Annealing is a syneresis phenomenon, wherein the primary gel structure is shrunk as evidenced by loss of water from the membrane. Annealing may be achieved by immersion of the swollen primary gel structure in a hot water bath. In another annealing procedure, water is extracted from the primary gel structure by a solvent treatment which comprises immersing the swollen primary gel structure in a suitable water-miscible solvent as disclosed in copending application of Charles R. Cannon, Paul A. Cantor and William M. King, Ser. No. 528,064, filed Feb. 17, 1966 now Pat. No. 3,432,548.

Materials other than Loeb's perchlorate salts may be used as swelling agents, for example, certain organic compounds as disclosed in a copending application of William M. King and Paul A. Cantor, Ser. No. 521,034, filed Jan. 17, 1966, now abandoned and succeeded by continuation application Ser. No. 847,496 filed July 14, 1969. Mineral acids, for example, perchloric acid and phosphoric acid are also useful as swelling agents as disclosed in copending application of William M. King and Paul A. Cantor, Ser. No. 538,498, filed Feb. 21, 1966 now Pat. No. 3,444,286. Water is the most common solvating agent; however, other materials have been suggested for this role, e.g. the lower alcohols such as methanol or ethanol and formamide. In some instances the same material may serve in more than one role, for example, a compound may be both a swelling agent and solvent for the cellulose acetate.

The mechanism involved in the formation of the desalination membrane is basically a gelation process, involving the coagulation of the cellulose ester solution into a comparatively rigid mass which incorporates a large amount of water. It is known that asymmetric semipermeable cellulose ester membranes suitable for reverse osmosis operations have a top or active layer and an underlying substrate layer. The active layer includes that surface of the membrane which is in contact with air during the casting process. The cellulose ester of the active layer tends to exist as a compacted mass of polymer molecules in contrast to the open cell sponge structure which predominates in the substructure layer. Electronmicroscopy has shown the membrane to posses a grainy substructure and a relatively clear top layer. Desalination only occurs when the active layer or surface is in contact with the saline solution. It is believed that the thickness of the active layer is between approximately 0.1 and 5% of the total membrane thickness. Typically, the moisture content of the cellulose ester membrane following annealing (syneresis) is in the range of 50 to 70% of the total weight of the membrane.

Workers in the area of cellulose ester reverse osmosis membrane research have been aware that the composition of the polymer casting solutions including the particular solvent employed, the swelling agent and the solvating agent utilized along with fabrication temperture and other processing considerations surrounding fabrication have a bearing upon the water flux (the rate of water transport across the membrane) and the selectivity of the product membrane. It is possible by judicious selection of the components of the casting solution and processing conditions to improve flux and selectivity. Selectivity pertains to the semipermeable characteristic of the membrane which is the ability to restrain the passage of salt.

It is known as disclosed in Ser. No. 546,591, filed May 2, 1966, Charles R. Cannon, now Pat. No. 3,497,072, that cellulose acetate reverse osmosis membranes having an acetyl content in the range of about 41.5 to about 42.7% (this being equivalent to a degree of substitution of 2.63 to 2.76) by weight of the cellulose acetate imparts high flux ability and superior salt retention properties.

Heretofore, the cellulose reverse osmosis membranes have been prepared chiefly from cellulose acetate compositions. Some attention has been given to the preparation of reverse osmosis membranes from cellulose propionate and other cellulose monoesters; however, the alternative pure cellulose esters have exhibited no significant advantages over the cellulose acetate membrane and little interest has been shown in their development.

It has now been discovered that reverse osmosis membranes of acceptable properties and in some instances superior characteristics may be prepared from mixed esters of cellulose. The degree of the mixed ester substitution for the hydroxyl groups of the cellulose is important and desirably the degree of substitution (D.S.) of the total esters is in the range of 2.4 to 2.8, and preferably in the more limited range of 2.5 to 2.7. The maximum degree of ester substitution into cellulose is 3. Commercial cellulose diacetates have a degree of substitution of about 2.5 or less (usually in excess of 2.0) while commercial cellulose triacetates typically have a degree of substitution of 2.8 or greater. It will be noted that the preferred degree of substitution in the mixed ester membrane approximates the degree of substitution found desirable in the cellulose acetate membrane reported by Charles R. Cannon in his U.S. application Ser. No. 546,591 mentioned above. This is surprising as it was anticipated that the preferred degree of substitution would vary with different mixed ester membranes, being influenced by the differing ester groups present.

The mixed ester membranes of the invention compared to the conventional cellulose diacetate membrane have superior resistance to biological, hydrolytic and mechanical degradation, providing a generally more stable membrane with a longer life.

A preferred mixed ester membrane of the invention employs acetate as the first ester with the second ester being selected to impart or enhance some particular property of the membranes. Generally speaking, the second ester will have a carbon content in the range of 3 to 5 atoms, if being generally found that a second ester having more than 8 carbon atoms will have a plasticizing effect, making the membrane too soft for some applications. In a preferred embodiment of the mixed ester membrane of the invention one of the esters contains an unsaturated group which will permit cross-linking of the membrane, giving a further increase in membrane stability over longer periods of use. Cross-linking of the cellulose chains of a reverse osmosis membrane provides an acetone-insoluble memberane, permitting the reverse osmosis treatment of solutions which normally would dissolve or attack the conventional cellulose acetate membrane. A particular useful mixed ester having an unsaturated group is cellulose acetate methacrylate, which has been demonstrated to provide a superior membrane of extremely high salt retention and adequate flux to desalinate ocean water in a single passage through the membranes. Cross-linking of the cellulose ester chains significantly lessens the rate of flux decline over extended periods of use. For example, the decline in flux of the ordinary cellulose diacetate membrane at high pressure, e.g. 1500 p.s.i., is such that the flux after one year of operation is characteristically less than half that at the beginning, and hence generally no longer economical to use. With the cellulose acetate methacrylate mixed ester membrane of the invention the rate of flux decline is much less rapid and extrapolated data indicates that such cross-linked mixed ester membranes will be capable of economic operating for a year or longer.

The cellulose mixed esters used in the preparation of the membranes of the invention may be conveniently prepared by esterification of commercial cellulose acetates of low degrees of substitution, for example, a commercial cellulose acetate of 2.41 D.S. (degree of substitution) or other commercial cellulose acetate. Unesterified cellulose may be employed, in which event the cellulose is subjected to two or more successive esterifications to form the mixed ester polymer used in the preparation of the membrane of the invention. A particularly useful esterification procedure is a modification of the method described in the literature found in the Journal of American Chemical Society, 75, 80 (1953), C. J. Malm, L. J. Tanghe, B. C. Laird, and G. D. Smith. The mixed esters are preferably prepared by reaction of cellulose acetate with the appropriate acid chlorides in the desired amount in the presence of an organic base catalyst (e.g., pyridine or triethylamine). The synthetic esters are purified by reprecipitation and then analyzed for total D.S. by standard saponification techniques.

The membranes of the examples were prepared from the synthetic esters using a casting solution typically composed of the cellulose esters (10 parts by weight), acetone as the solvent (15–20 parts), formamide or methanol or water as the solvating agent (5–12 parts) and maleic acid as the swelling agent (1–5 parts). The solutions were cast about 0.010 inch thick on glass plates and −10° C. using a doctor knife. After standing at −10° C. for 0.25 to 3 minutes, the plates were placed in ice water until the gelled membrane floated free. The membrane was then heat-treated by immersion in water for 3 minutes at 85 or 90° C., generally the latter. The exact composition of the casting solution, the time of standing of −10° C. and the heat treatment temperature may be adjusted for each type to achieve the optimum flux and salt retention.

The membranes were tested at 1500 p.s.i. in reverse osmosis cells of the type described in the Journal of Applied Polymer Science, 9 1873 (1965), R. E. Kesting, M. K. Barsh, and A. L. Vincent, using 3.5% sodium chloride brine as test solutions at 25±1° C. The product water was analyzed for salt content by electrical conductivity and the flux was computed from the volume and duration of its collection.

EXAMPLE I

Membranes of this example were prepared from a commercial cellulose acetate polymer having a degree of acetate substitution of 2.5. The respective polymers were methacrylated to the indicated total D.S. The casting solutions for membranes CAM-3, -4 and -5 of Table I below contain: 25 grams of cellulose acetate methacrylate of the D.S. indicated, 75 grams of acetone, 22 grams of formamide, and 12 grams of maleic acid. For membrane CAM-4A, the casting formulation contained 20 grams of formamide but was otherwise the same. For membranes CAM-1 and CAM-2, 17 grams and 20 grams of water, respectively, were used in place of formamide. Flux is expressed in gallons of product water per square foot of membrane per day (g.f.d.).

TABLE I

| Polymer | D.S. Calculated | D.S. Analyzed | Flux, g.f.d. | Product concentration NaCl, p.p.m. |
|---|---|---|---|---|
| CAM-1 | 2.54 | | 10.3±0.3 | 496±36 |
| CAM-2 | 2.6 | | 10.2±0.2 | 284±38 |
| CAM-3 | 2.74 | 2.74 | 10.2±0.4 | 157±28 |
| CAM-4 | 2.8 | | 10.1±0.1 | 179±52 |
| CAM-4A | 2.8 | | 7.2±0.4 | 78±13 |
| CAM-5 | 3.0 | 2.95 | 6.2±0.2 | 330±138 |

From the data presented in Table I, it is evident that the degree of substitution is a very important factor in salt rejection.

EXAMPLE II

Starting with a commercial cellulose acetate having a D.S. of 2.5, a cellulose acetate propionate and cellulose acetate isobutyrate were prepared to have a D.S. of 2.74. Casting solution formulations of the two respective polymers contained 25 grams of the synthetic polymer, 75 grams of acetone, 22 grams of formamide and 12 grams of maleic acid. Membranes fabricated from the casting solutions yielded the following osmotic properties, when tested at 1500 p.s.i. on 3.5% sodium chloride feed solution. The results of the test are reported in Table II.

TABLE II

| Polymer | Flux, g.f.d. | Product concentration NaCl, p.p.m. |
|---|---|---|
| CA propionate | 15.3 | 191 |
| CA isobutyrate | 11.2 | 190 |

The foregoing two mixed ester membranes demonstrate a 99.46% salt rejection.

EXAMPLE III

Starting with a commercial cellulose acetate of a D.S. of 2.5, a synthetic cellulose acetate maleate having a calculated D.S. of 2.6 was prepared. Casting solutions containing 25 grams of the synthetic polymer, 75 grams of acetone and the indicated amounts of water and maleic acid were used to prepare the several membranes of Table III.

TABLE III

| Water, g. | Maleic acid, g. | Flux, g.f.d. | Product concentration NaCl, p.p.m. |
|---|---|---|---|
| 16 | 12 | 6.4 | 610 |
| 16 | 12 | 6.2 | 480 |
| 18 | 12 | 7.2 | 590 |
| 18 | 12 | 6.0 | 492 |
| 20 | 12 | 7.2 | 750 |
| 20 | 12 | 8.4 | 570 |
| 20 | 12 | 8.4 | 540 |
| 23 | 12 | 9.0 | 630 |
| 23 | 12 | 9.6 | 650 |
| 23 | 12 | 8.4 | 540 |

EXAMPLE IV

This example is directed to cross-linking of membranes composed of cellulose acetate methacrylate employing gamma irradiation. The cellulose acetate methacrylate had a D.S. of 2.74 (D.S. of methacrylate of 0.24) and each of the several membranes tested were given a total dose of $1 \times 10^5$ rads gamma radiation. The sixth membranes evaluated had fluxes falling within the range of 10.5 to 11.3 gallons per foot per day with the product water having salt concentrations within the range of 400–480 parts per million. Five of the foregoing test membranes had fluxes between 11.0 and 11.3 g.f.d. The non-irradiated control membranes had an average flux of 9.9 g.f.d. and salt concentration of 250 p.p.m. It is thus seen that in this example cross-linking gave an increase in flux and a small increase in salt concentration in the product waters but the product waters would still be considered potable since they contained less than 500 parts per million of salt. Upon mechanical testing of the membranes, significant increases in the elastic modulus and in the stress at yield were found. Such changes reflect the effect of cross-linking.

Hydrogen peroxide has also been used for cross-linking of cellulose acetate methacrylate, as has the combination of hydrogen peroxide and ferrous sulfate.

While several embodiments of the invention have been illustrated and described, it will be understood that the invention should not be construed as being limited thereto, but only to the lawful scope of the appended claims.

What is claimed is:

1. A reverse osmosis method of separating water from an aqueous solution employing a semipermeable cellulose polymeric membrane, said membrane comprising:

providing an aqueous solution to one side of the cellulose polymeric membrane, said membrane being prepared from mixed esters of cellulose and having a degree of ester substitution of the total esters in the range of 2.4 to 2.8, said membrane being further characterized in one of the mixed esters containing an unsaturated group with cross-linking of the membrane occurring through said unsaturated group;

applying pressure to the aqueous solution in excess of the osmotic pressure of said solution; and recovering water of reduced solute content from the other side of the membrane.

2. A method in accordance with claim 1 wherein the preferred degree of substitution is in the range of 2.5 to 2.7.

3. A method in accordance with claim 1 wherein the mixed esters comprise acetate and a second ester with the second ester containing the unsaturated group.

4. A method in accordance with claim 3 wherein the second ester has a carbon content in the range of 3 to 5 atoms.

5. A method in accordance with claim 3 wherein the second ester is selected from the group of methacrylate and maleate.

References Cited

UNITED STATES PATENTS

| 2,930,754 | 3/1960 | Stuckey | 210—23 |
| 3,083,118 | 3/1963 | Bridgefurd | 117—47 |
| 2,140,256 | 7/1964 | Martin et al. | 210—22X |
| 3,228,876 | 1/1966 | Matton | 210—321X |
| 3,310,488 | 3/1967 | Loeb et al. | 210—22 |

OTHER REFERENCES

Baddour et al., "Expanded Glassy Polymers as Reverse Osmosis Membranes," from U.S. Dept. of Interior, R & D Report No. 144, received in Patent Office, Dec. 10, 1965, 81 pages, pp. 49–54 relied on.

Friedlander et al., "Desalting by Reverse Osmosis," from Chemical Engineering, June 6, 1966, pp. 145–148 relied on.

Lonsdale et al., "Reverse Osmosis for Water Desalination," from U.S. Dept. of Interior R & D Report No. 111, received in Patent Office June 9, 1965, 142 pages, pp. 97–107 relied on.

FRANK A SPEAR, JR., Primary Examiner

U.S. Cl. X.R.

210—321, 500